Dec. 8, 1942. K. FROEHLICH ET AL 2,304,161
REVERSING AND LEAD CONTROLLING MECHANISM FOR FUEL INJECTION ENGINES
Filed May 23, 1941 5 Sheets-Sheet 2

Fig. 2

Patented Dec. 8, 1942

2,304,161

UNITED STATES PATENT OFFICE 2,304,161

REVERSING AND LEAD CONTROLLING MECHANISM FOR FUEL INJECTION ENGINES

Kurt Froehlich and Emil Grieshaber, Milwaukee, Wis., assignors to Nordberg Manufacturing Company, Milwaukee, Wis., a corporation of Wisconsin Application May 23, 1941, Serial No. 394,936

20 Claims. (Cl. 123—41)

This invention relates to reversing gears for engines of the fuel injection type such as Diesel engines and provides for the timing of fuel injection both for forward and for reverse running, so that in each direction of running variable lead may be had. The lead adjustment may be manually made, but in the preferred arrangement the lead is adjusted by a speed responsive governor subject to the speed of the engine so that the lead is coordinated with engine speed.

The invention is believed to have its greatest utility in engines in which the fuel injection is of the mechanical or positive type, but is not necessarily limited thereto.

In the preferred embodiment, control of the engine speed may be effected by the known expedient of variably loading a speed responsive governor which controls the quantity of fuel injected. In such case control of injection timing or lead is effected by a separate and distinct governor which is not variably loaded.

In the allowed application of George E. Ramstad, Serial No. 258,777, filed February 27, 1939, issued to applicant's assignee on June 3, 1941, as Patent No. 2,243,883, there is described a reversing gear applied to a four-cycle engine. This controls reversal not only of the fuel pump mechanism and the inlet and exhaust valves, but also reversal of the air starting mechanism. The controls are so related and are provided with such interlocks, that a single controller is movable from a neutral or stop position in two opposite directions corresponding to opposite directions of rotation of the engine crankshaft. Consequently, there is a forward range and a reverse range of motion of the controller which meet at the stop position. Each of these ranges is divided into three sub-ranges. Counted in order from the stop position, each first sub-range is one in which the reversing movement takes place. The second sub-range is an air starting range in which the engine is put into motion by compressed air controlled by air starting valves. The third is the fuel control range within which the fuel feed is controlled, the fuel feed increasing with displacement of the controller from the stop position.

In order to develop fully the characteristics of the invention, and to indicate its adaptability to highly organized control mechanisms, it will be described as embodied with a controller mechanism of the Ramstad type mentioned. However, the novel features of the present invention have primarily to do with lead control and will be discussed from that standpoint.

The invention provides variably timed injection, the timing being susceptible to governor control or manual control, or in fact to any type of control known in the art. The mechanism is particularly intended for two cycle engines of the positive injection type, because well suited to withstand the torque reactions encountered with such engines.

The invention contemplates displacing the fuel camshaft of a two-cycle Diesel engine angularly with respect to the crankshaft so that a single set of fuel cams may operate alternatively for forward and for reverse running.

The adjustment of the position of the fuel cam shaft with respect to the engine crankshaft is produced by means of a rack which rotates a gear associated with a planetary train forming part of the camshaft drive. A reversing motor moves the rack full stroke between a forward running position and a reverse running position. The gear above mentioned is so related to the planetary train as to afford limited lost motion. Thus the motion of the reversing motor full stroke forces a component of the planetary train nearly to a limiting position to which it is then moved and in which it is retained by an impositive detent. It is there further retained by the force reaction of the cam shaft as the engine runs. Two embodiments of this concept are illustrated.

The lost motion connection affords the needed range for lead adjustment which is effected by two reaction cams. Where this adjustment is to be made in accordance with engine speed, the cams are adjusted by a servomotor under the control of a governor which responds to engine speed. In all embodiments the cams absorb the forces developed by the drive of the camshaft, and thus relieve the reversing motor of the camshaft driving load.

The servomotor simply relieves the governor of load so that the cams will be accurately positioned in response to governor indications.

When a centrifugal governor is used, and since such a governor is indifferent to its direction of rotation, the reaction cams are indifferent to the direction of rotation of the governor. The cams are effective selectively, according to the direction in which the engine runs, but they are adjusted simultaneously and in the same sense. Thus, the lead control is wholly independent of the direction of rotation and becomes effective through one or another cam, depending upon the position of the reversing motor and the planetary component shifted thereby.

There is an interlock between the reversing motor and the maneuvering shaft which prevents motion of the maneuvering shaft beyond the reversing range until the reversing shift is complete. As soon as the reversing shift is complete, the operator is free to move the maneuvering gear into the air starting range.

The invention may be embodied in specifically different forms, and three embodiments will be described by reference to the accompanying drawings, in which:

Figures 1 and 2, when assembled in the order stated from left to right, produce a diagram of the maneuvering mechanism. Generally stated, the subject matter of Figure 1 relates to the invention here discussed, and the subject matter of Figure 2 is an adaptation of the Ramstad maneuvering mechanism devised to avail of the principles of the present invention.

Figures 5, 6, 7, 10:
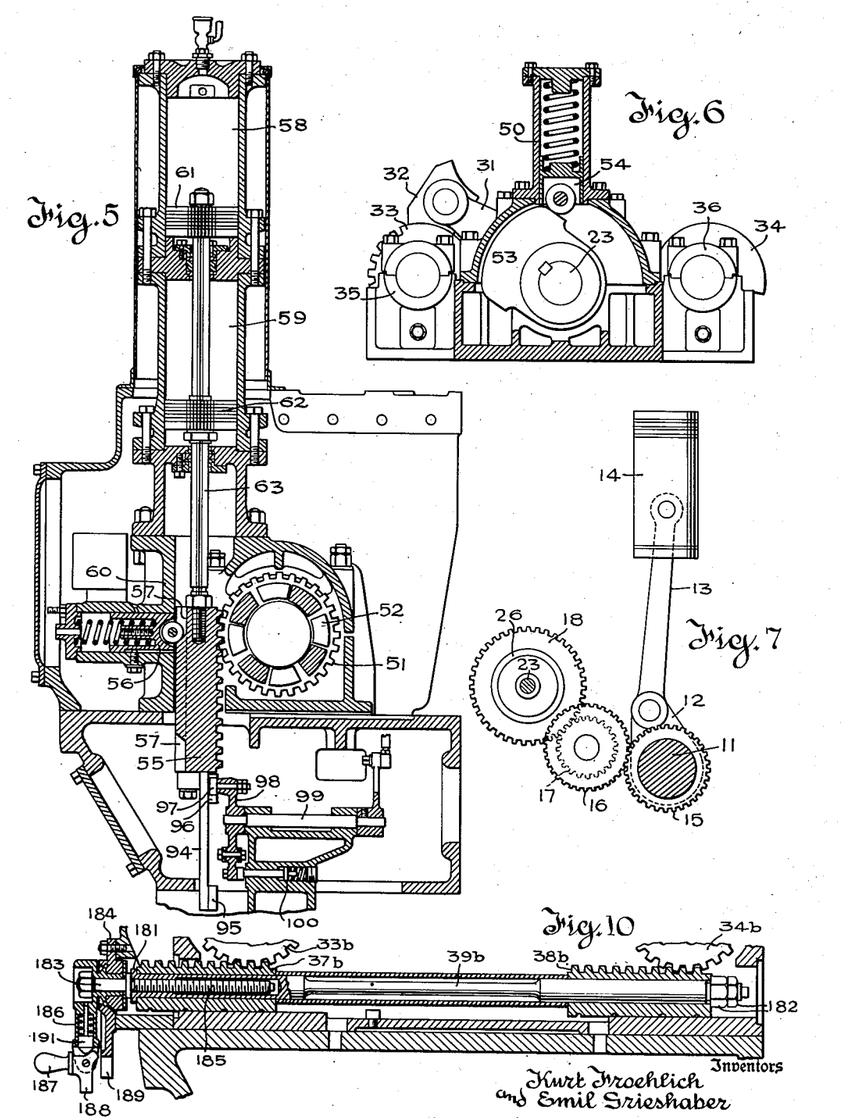
Figure 5 is a section on the line 5—5 of Figure 4.
Figure 6 is a section on the line 6—6 of Figure 4.
Figure 7 is a diagram showing the gear train from the crankshaft to the ring gear forming part of the planetary train through which the camshaft is driven.
Figure 10 is a view similar to Fig. 3 showing the substitution of manually actuated means for adjusting the lead controlling cams.

Referring first to Figure 7, the engine crankshaft appears at 11, a crank at 12, connecting rod at 13, and piston at 14. The invention can be applied to engines having various numbers of cylinders, and no illustration of the complete engine appears necessary.

On crankshaft 11 is a gear 15 which drives an idler gear 16 fast to smaller pinion 17. This meshes with, and has a pitch diameter half that of ring gear 18. (See Figs. 1, 3 and 4.) Thus ring gear 18 turns in the same direction as the crankshaft at half the angular rate.

The camshaft 19 is coaxial with ring gear 18 and carries the fuel cams 21 which actuate the fuel injection plungers 22. These plungers actuate fuel injecting pumps or the equivalent, not shown. These pumps may be of any preferred form and there is one cam, plunger and pump for each engine cylinder. The angular spacing of the cams on the crankshaft is coordinated with the angular spacing of the cranks on the crankshaft according to established principle. To simplify the drawings, only one cam and plunger is shown.

Since the cams 21 must operate in either direction of rotation, they are symmetrical with respect to a line (i. e. the shaft diameter drawn through the nose of the cam).

Figure 1:
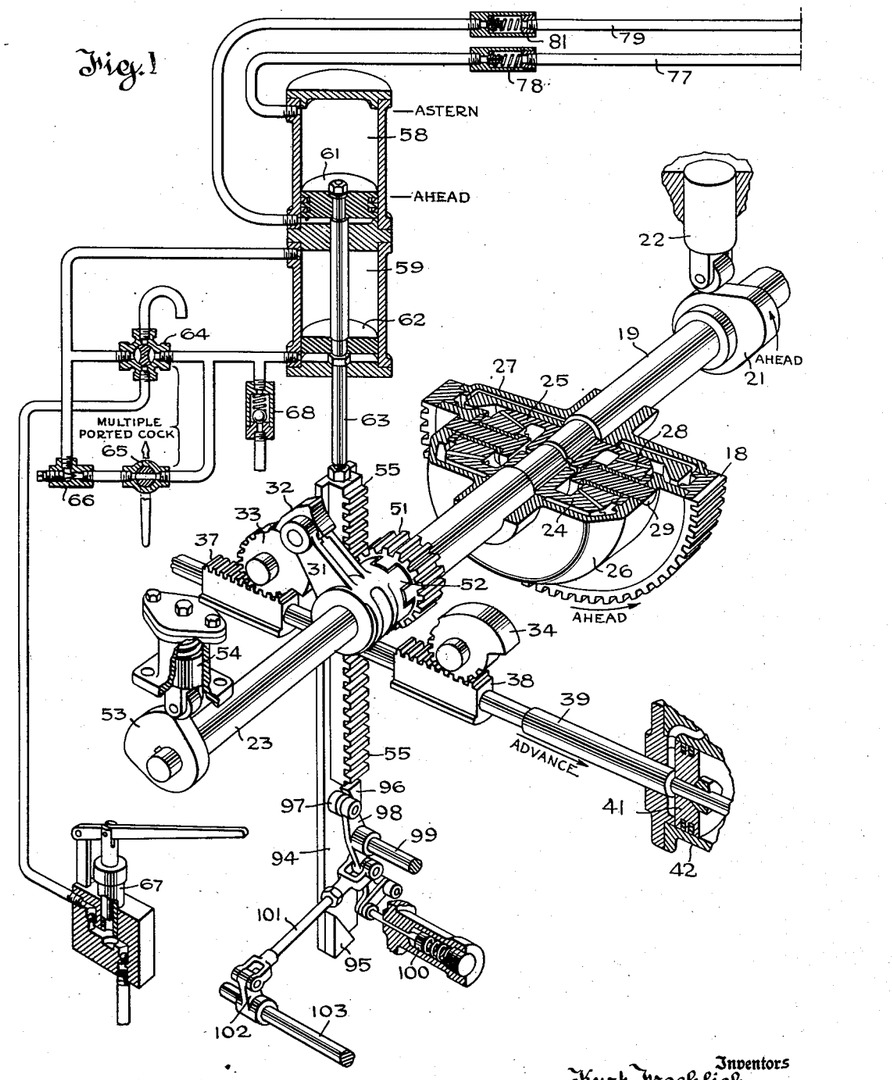
Figure 1 is a perspective diagram of the mechanism used to change the relation of the camshaft to the crankshaft for forward and reverse running and of the mechanism which controls the lead of fuel injection.

One function of the reversing gear is to change the angular position of camshaft 19 relatively to crankshaft 11 to establish the basic timing of fuel injection for opposite directions of running. "Ahead" setting is shown in Figure 1. This change is accomplished by rotating shaft 23 aligned with camshaft 19 a like amount.

The adjacent ends of the aligned shafts 19 and 23 carry opposed bevel sun-gears 24 and 25. The ring gear 18 is sustained by a housing 26 swiveled on shaft 23 and by a disc 27 swiveled on shaft 19. These house the sun-gears 24 and 25 and also an annular series of bevel planet-gears 28 which turn on radial journals 29 projecting inward from housing 26. The planet-gears mesh with both sun-gears.

Shaft 23 is normally held against rotation so sun-gear 24 is fixed. It follows that planet-gears 28 when revolved by the ring-gear 18 drive sun-gear 25 at twice the angular velocity of ring-gear 18; that is to say, at crankshaft speed. Thus, the camshaft 19 is driven at a speed appropriate to a two-stroke cycle. In the example illustrated the camshaft and crankshaft turn in the same direction.

Fixed on shaft 23 is arm 31 with rockable contact shoe 32. The reversing shift of shaft 23 is limited by collision of shoe 32 with one or the other of two lead controlling cams 33, 34. These are of approximately identical spiral contour and are rotatably mounted on bearings 35, 36, so as to be angularly adjustable by racks 37, 38 on cross rod assembly 39, whose construction is clearly shown in Figure 3. The racks mesh with sector gears formed integrally with respective cams, so that motion of the rack adjusts both cams 33 and 34 equally and in the same sense. The thrust of the camshaft drive urges the arm 31 toward the active cam and the adjustment of the cam determines the lead, as will be further explained.

Figure 3:
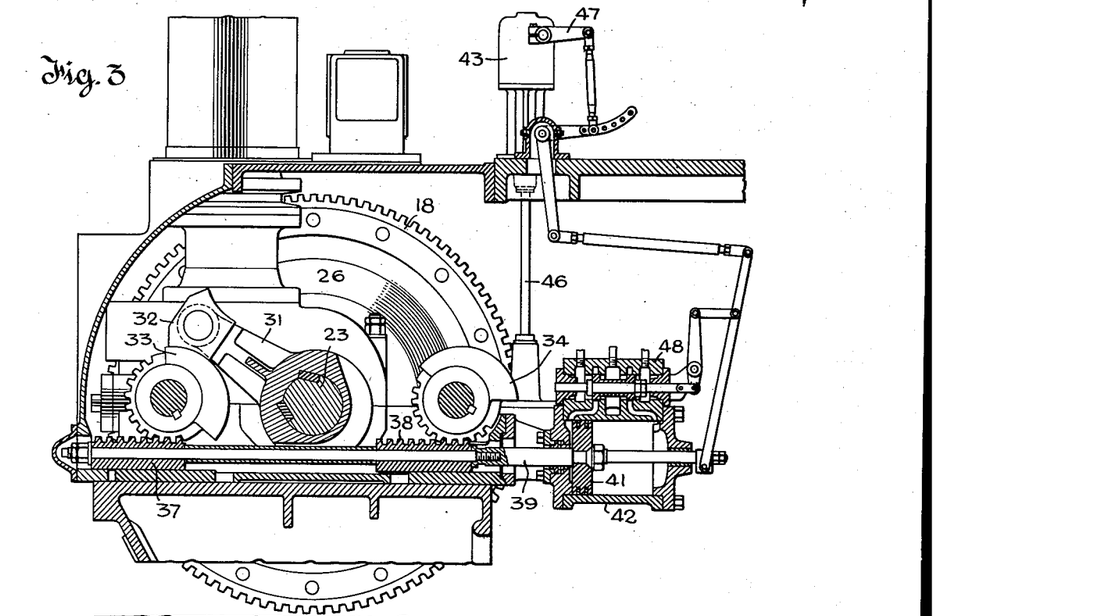
Figure 3 is a sectional elevation showing the actual construction of the device and indicating the relation of the centrifugal governor and its servomotor to the reversing and lead controlling gear. The plane of section is indicated by lines 3—3 on Fig. 4.
Figure 4:
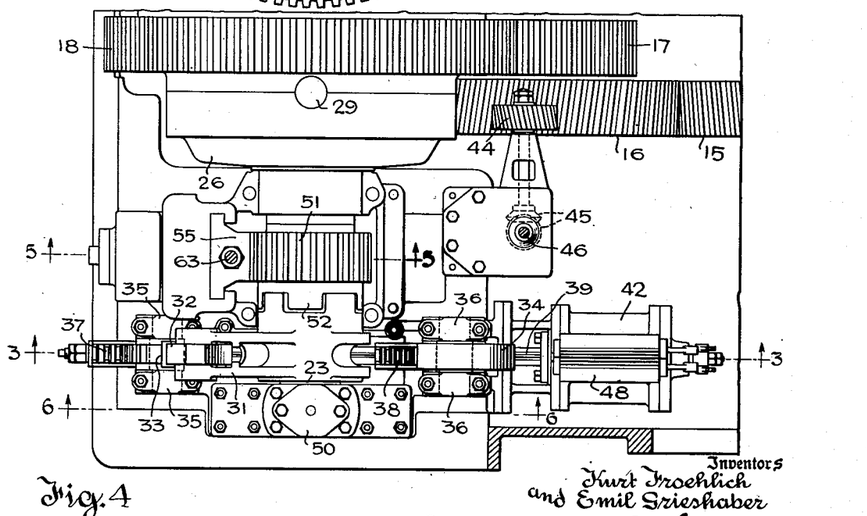
Figure 4 is a view generally in plan of the mechanism illustrated in Figure 3. Portions are broken away to render certain parts visible.

The cross rod assembly 39 is connected to and actuated by the piston 41 of a servomotor having a cylinder 42, and the piston 41 moves in accordance with the indications of a speed responsive governor 43, best shown in Figures 3 and 4.

The governor 43 is driven from idler 16 through pinion 44, miter gears 45 and shaft 46. The arm 47 moves in relation to engine speed (swinging downward in response to rising speed) and, as clearly shown in Figure 3, is connected by a known follow-up linkage to piston 41 and to distributing valve 48 which is a piston valve of the end admission, middle exhaust type controlling the supply and exhaust of hydraulic pressure fluid to and from the working spaces at the two ends of cylinder 42. So far as is here material, piston 41 moves to positions corresponding to the various positions of governor arm 47 without imposing on arm 47 the work of shifting the piston 41, racks 37, 38 and cams 33, 34. Piston 41 moves to the right (Fig. 3) in response to rising speed turning cams 33, 34 counterclockwise.

Cam 33 controls the lead when running ahead (see Figure 1) and cam 34 when running astern, and each increases the lead in response to rising speed in the corresponding direction of running. The arm 31 is urged toward the appropriate cam by the force reaction developed by the camshaft drive. Since the cams may be made of ample size to resist the load and the consequent wear, adequate strength and maintained accuracy are assured.

The basic shift which sets the shaft 23 and consequently the camshaft 19 for forward or reverse conditions is made by turning a gear 51 which is swiveled on shaft 23 and has a lost motion dental clutch connection 52 with the hub of arm 31. The degree of lost motion is sufficient, or slightly more than sufficient, to permit the lead adjustment, and the angular range of rotation of the gear 51 is less than sufficient to turn shaft 23 through its full angular range by approximately the amount of lost motion afforded by dental connection 52.

Full throw of the shaft 23 to bring shoe 32 against one or the other of cams 33, 34 in their minimum lead positions is assured by cam 53 on shaft 23 and spring plunger 54 which coacts with the cam 53 and serves as an impositive detent or biasing device in the final range of motion of shaft 23 as it turns in each direction (Fig. 6). Near each limit of motion of shaft 23, the biasing device becomes effective to advance shaft 23 further and bring shoe 32 against the lead controlling cam 33 or 34. This renders the lost motion at 52 available for lead adjustments. The plunger 54 is enclosed in a housing 50.

The gear 51 is turned through the range above stated by a reciprocable rack 55 (Figs. 1, 4 and 5). As shown in Figure 5, a spring urged plunger 56 coacts with one or the other of two detent notches 57 on the back of the rack and serves as an impositive detent to retain the rack in each end position. The rack guiding structure 60 is clearly shown in Figure 5 and need not be elaborated.

Two aligned double acting cylinders 58 and 59 receive pistons 61 and 62 connected by piston rod 63 with the upper end of rack 55. Cylinder 58 is a motor cylinder and cylinder 59 is normally an oil filled check cylinder. With the four-way valve 64 and cock 65 set in normal position, as shown in Figure 1, needle valve 66 controls the rate of shift by throttling oil flow. Closure of cock 65 and appropriate setting of valve 64 connect hand-operated oil pump 67 to force pistons 62 up or down, as may be desired in making timing or other adjustments when the engine is shut down. Connection 68 leads from the pressure lubricating system of the engine and serves to keep cylinder 59 charged with oil under running conditions.

The reversing and lead adjusting mechanism above described involves the main features of the present invention. Ancillary features connected with the adaptation of this reversing gear to the Ramstad unitary maneuvering gear will now be explained.

Figure 2:
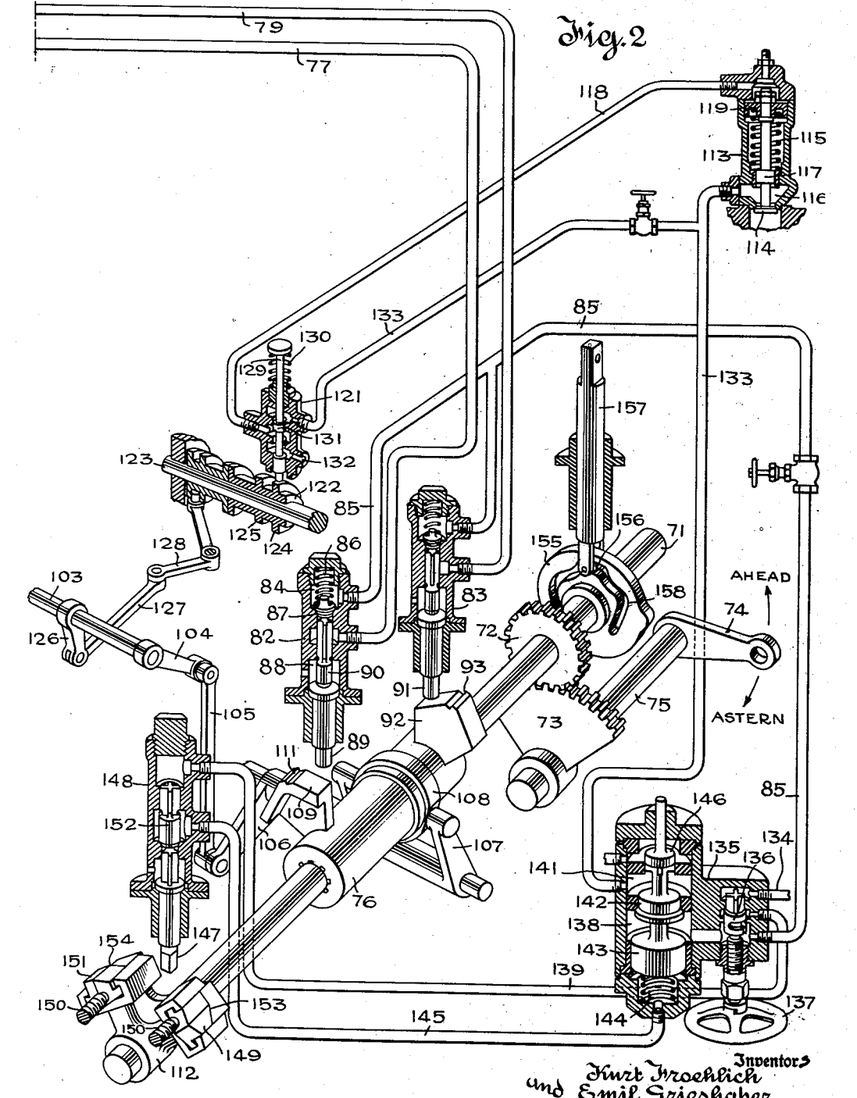
Figure 2 is a perspective diagram of the maneuvering mechanism which controls not only the reversing motor shown in Fig. 1, but also the starting air and the loading mechanism for the speed governor, or equivalent speed control.

The shaft 71 is the maneuvering shaft and in the embodiment illustrated turns about 270° between its full speed ahead and full speed astern positions. In Figure 2 the shaft 71 is shown in its neutral or stop position which is half way between the two positions just mentioned. Shaft 71 is rotated through a pinion 72 and sector gear 73 by a lever 74 fast on the shaft 75 which also carries the sector 73.

The maneuvering shaft 71 carries three mechanisms which become operative in the three successive sub-ranges which together comprise the total range of motion in each direction from the neutral position illustrated.

The first of the three mechanisms carried by the shaft 71 is the sleeve 76 which is splined on the shaft 71 so that it turns therewith and is shiftable axially with reference thereto; the axial shift having to do with an interlock which prevents motion beyond the reversing sub-range until the reversing shift of the reversing mechanism has actually occurred.

The sleeve 76 carries cams which selectively operate admission and exhaust valves controlling supply and exhaust to and from the opposite ends of the cylinder 58. A connection 77 leads to the upper end of the cylinder and contains a ported check valve 78 which restricts flow toward the cylinder but opens to permit free flow away therefrom. Connection 79 leads to the lower end of the cylinder and contains a similar check valve 81 for performing a similar function.

The connection 77 leads to an "ahead" valve housing 82 and connection 79 leads to an "astern" valve housing 83. The mechanisms in the housings 82 and 83 are identical and the description of that in the housing 82 will suffice. In the top of the housing is a supply chamber 84 to which the compressed air supply line 85 leads. The pressure of supply and the coil compression spring 86 each urge the inlet poppet valve 87 downward so that the connection 77 which leads to the chamber below the poppet valve 87 is cut off from supply. This chamber is at such times connected to atmosphere past the pilot of the valve 87 to the exhaust chamber 88. When the stem 89 is forced upward the exhaust connection is closed by a valve head 90 in the lower end of the pilot and the supply pipe 85 is connected to the line 77 so that the piston 61 is forced downward to "ahead" position as shown in Figure 1. The stem 91 associated with housing 83 performs a similar function to that performed by the stem 89 which is to say that when the stem 91 is forced upward the line 79 is disconnected from atmosphere and is connected to the supply line 85 so that the piston 61 will be forced full stroke upward to "astern" position.

It will be observed that in the neutral position shown in Figure 1 both ends of cylinder 58 are vented to atmosphere so that the piston 61 and the connected rack 55 are then retained merely by the detent plunger 56 (see Fig. 5). This is entirely practicable because no working thrust is delivered to the rack 55 by the operation of the engine.

With the parts in the position shown in Figures 1 and 2, the astern cam 92 on sleeve 76 is in position to lift stem 91 if the shaft 71 be turned in astern direction, that is, counterclockwise as viewed in Figure 2. Rotation of the shaft counterclockwise forces the stem upward until the stem strikes the interlock shoulder 93 on the cam. This limits motion of the maneuvering shaft 71 counterclockwise until the sleeve 76 is shifted axially away from the observer as viewed in Figure 2.

This shift occurs upon completion of the upward motion of piston 61 and rack 55. To effect this shift, the rack carries an extension 94 on the lower end of which is a beveled cam 95 and on the upper end of which is a beveled cam 96. At the limits of rack motion, these cams shift a roller 97 carried by the arm 98, the arm being rockably supported by the shaft 99. A detent 100 is effective in each limiting position to retain arm 98 impositively.

The arm 98 is connected by the link 101, arm 102, rock shaft 103, arm 104, link 105 and arm 106 with the rocking yoke 107 which is pinned to a sleeve 108 swiveled on the splined sleeve 76.

Remembering that lifting of the stem 91 causes the rack 55 to move upward, it will be observed that the cam 95 will shift roller 97 and through the linkage described will shift the sleeve 76 away from the observer so that shoulder 93 passes clear of stem 91 just as the rack reaches its upper limit of motion. This frees the maneuvering shaft 71 so that it may be moved further into the air starting range. It cannot be moved into that range until the rack 55 has completed its reversing shift.

The axial shift positions a second cam 109 with interlock shoulder 111 to actuate the stem 89 if the shaft 71 be rotated clockwise. With the cam 109 in active position, the same interlock sequence as to it will occur but in the opposite sense. Thus, the first effect of shifting the shaft 71 from neutral or stop position in either direction is to produce a complete reversing movement of the rack 55, unless the rack is already in the proper position for the chosen direction of motion. If it is, motion into the air starting range is not obstructed.

It should be noted that the portion of shaft 103 included in Figure 1 does not align with that portion of shaft 103 included in Figure 2, despite the fact that these are portions of a single shaft. It was necessary to offset them to keep the figures within the available space and still use a practicable scale.

In the second or air-starting sub-range the air starting gear comes into effect and is brought into action by switch cam mechanism carried by the yoke 112 on shaft 71.

To permit an understanding of the operation of this mechanism, it is necessary to outline an air starting mechanism which is known in the art but which is one of several conveniently adaptable to use in this maneuvering gear. The shell 113 is the housing of a known type of air inlet valve device mounted in the engine cylinder head. The poppet valve 114 is the air inlet valve proper and is urged in a closing direction by a coil spring 115. The air supply chamber 116 is formed in the housing 115 between the poppet valve 114 and a piston 117 of approximately equal area mounted in the valve stem. Consequently, air pressure in chamber 116 exerts no opening bias on the valve 114. The valve 114 is forced open when, and only when, air under pressure is admitted through the connection 118 to the space above the piston 119 connected to the upper end of the valve stem.

To operate such valves, air is admitted through the connection 118 at proper times by a pilot-valve mechanism. The housing for one pilot valve is indicated at 121. It should be understood however, that there is a pilot valve 121 and an associated starting valve 113 for each cylinder to which air starting is applied. This may be each cylinder of the engine or only enough cylinders to insure starting. Both arrangements are known in the art.

The air starting cam sleeve 122 is splined on a shaft 123 driven by any suitable means at crankshaft speed. For each pilot starting valve 121, the sleeve carries two cams, an "ahead" cam 124 and an "astern" cam 125. These act selectively upon the air pilot valve according to the position of the sleeve 122. The sleeve 122 is shifted between forward and reverse positions by the rocking motion of the shaft 103 already described; the connections being an arm 126 on shaft 103, a link 127, and a bell crank 128 which carries a lug arranged to shift the sleeve 122. The construction is familiar and is shown with sufficient clearness in Figure 2.

The pilot valve stem 129 in housing 121 carries a piston valve 131 which in its upper position connects the line 118 with the exhaust port 132 and in its lower position disconnects these ports and establishes communication between the supply line 133 and the connection 118. The upper face of the piston valve 131 is subject to pressure in the supply line 133 so that when air under pressure is admitted to supply line 133 the stem 129 moves downward into coactive relation with the cam 124 or 125 against the resistance of the coil compression spring 130 which normally retracts the valve stem 129 out of the cam path. This is a familiar means for retracting the air pilot valves from the cams to permit axial shifting of the cams during reversal. Since shift of sleeve 122 must occur before any air starting function is possible, an adequate safe-guard is had.

The supply line 133 not only communicates with the housing 121 but also with the supply chamber 116 of the starting valve 113, and the action of the maneuvering shaft 71 in the air starting sub-range is to close the normally open vent from line 133 and admit starting air to this line rendering the pilot valves and the starting valves operative.

Maneuvering air is supplied by line 134 to the main air valve housing 135. A stop valve 136 may be opened and closed by a hand wheel 137 and when open connects the line 134 with the line 85 and with the valve chamber 138 and the branch line 139. The line 133 is connected to a chamber 141 which is separated from chamber 138 by downwardly opening poppet valve 142. The poppet valve 142 is connected to a piston 143, larger than the valve 142, and subject on its upper face to pressure in the chamber 138 so that pressure in chamber 138 develops an opening bias on the valve 142. This is counteracted by an upward acting coil compression spring 144 and by supply pressure admitted to the space below piston 143 by way of connection 145.

When the valve 142 is closed, a valve 146 opens the chamber 141 and pipe 133 to atmosphere. Opening movement of the valve 142 entails closure of the vent valve 146. Consequently, the motion of the piston 143 upward vents the connection 133 and its motion downward subjects the connection 133 to supply pressure. This motion is determined by admitting and exhausting pressure to and from the branch connection 145. This function is performed by the switch cam mechanism carried by the yoke 112 and serving to operate the valve stem 147 of a pilot valve in housing 148.

After stem 91 has cleared interlock shoulder 93 (or after shoulder 89 has cleared interlock shoulder 111), further motion of shaft 71 causes the cam block 149 (or cam block 151) carried by yoke 112 to lift the stem 147. The effect is to lift the double seated poppet valve 152 so that it seats on its upper seat instead of its lower seat, which latter is its normal position. The effect is to disconnect supply branch 139 from the pipe 145 and vent pipe 145 to atmosphere.

In consequence piston 143 moves downward and starting air is admitted to pipe 133. This renders the starting valve mechanism active to start the engine in a direction determined by the position of sleeve 122. If the shaft 71 is turned beyond the air starting sub-range in either direction, the stem 147 is cleared and allowed to drop because the cam 149 or 151, as the case may be, passes beyond the stem. It is not desired to lift the stem 147 on return motion of the shaft 71 to its mid or stop position. Consequently, the cam blocks 149 and 151 are slidable in paths parallel with the axis of shaft 71 and have oblique surfaces 153 and 154 respectively. On return motion the oblique surface of the recently active cam strikes the side of stem 147 and displaces the cam without any lifting effect on the stem 147. As soon as the cam passes the stem 147, it is restored to its normal position by a fixed cam nose 150 coacting with the end of the displaced cam block.

The third control device carried by the maneuvering shaft 71 is the fuel control cam 155. This coacts with a roller follower 156 on the stem 157. Stem 157 could control the fuel feed to the engine in any known way. In the embodiment illustrated, the cam slot 158 is that used to operate a loading device which modifies the action of a centrifugal governor. The governor controls the fuel feed. The motion which occurs near the neutral position of shaft 71 has to do with certain functions peculiar to the structure of the governor and need not be discussed. The important thing is that after the shaft 71 has been turned in either direction beyond the air starting range, and hence into the fuel control range, the cam 155 draws the stem 157 downward and sets the governor for progressively increasing speed.

In this way a single maneuvering shaft 71 controls the setting of the reverse gear in ranges near the neutral or stop position; controls the operation of the air starting gear upon further angular displacement, and upon further displacement controls the fuel feed progressively.

Alternative embodiment

Figure 8:
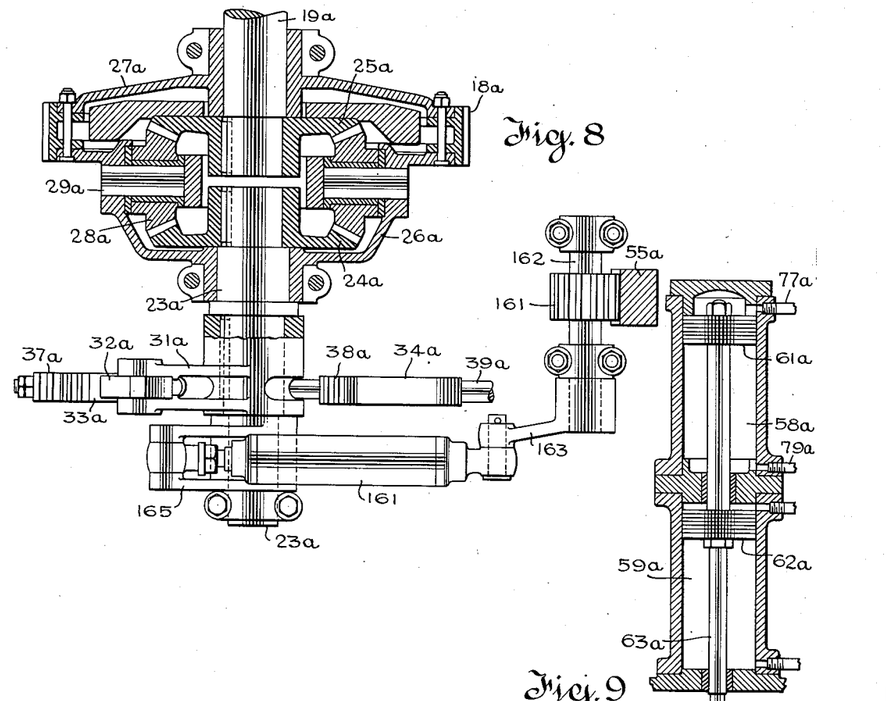
Figure 8 is a plan view somewhat similar to Figure 4 showing a modified arrangement.
Figure 9:
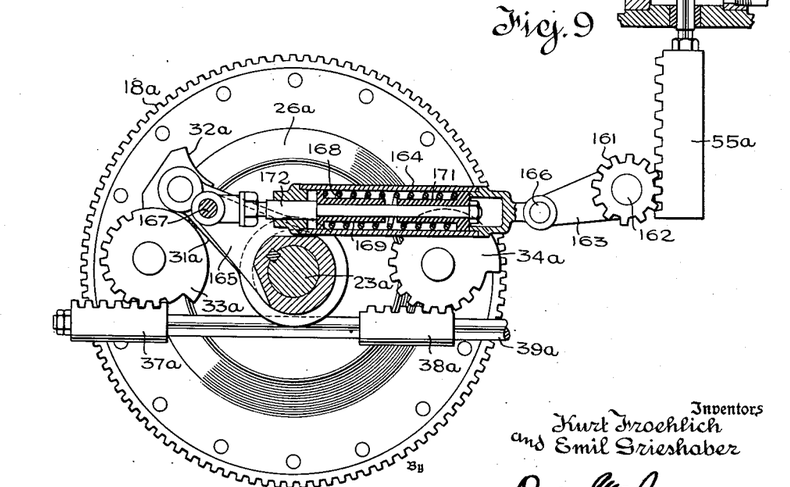
Figure 9 is a view partly in elevation and partly in section showing the structure of Figure 8.

An alternative embodiment, designed to avoid the use of the lost motion dental clutch 52, is illustrated in Figures 8 and 9. In these figures, parts which are substantially identical with parts in Figures 1 to 7, inclusive, are given the same reference numerals distinguished by the subscript a.

The difference resides in the operative connection between the rack 55a and the shaft 23a. The rack 55a meshes with a pinion 161 of such size that the full traverse of the rack turns the pinion at least 180°. The pinion 161 is fast on a shaft 162 to which is fixed the crank arm 163. The crank arm 163 is connected by an elastic pitman 164 with a crank 165 fast on the shaft 23a. The pitman is connected by a crankpin 166 with the crank 163 and by a pin 167 with the arm 165. The range of motion of the pin 166 somewhat exceeds the maximum range of motion of the pin 167 and the pitman 164 is so designed as to yield both in tension and in compression. Thus, motion of the rack 55a to its uppermost position urges shaft 23a yieldingly counterclockwise, while motion to its lowermost position holds it yieldingly at its limit of motion in a clockwise direction. The yielding action permits adjustment by the cams 33a and 34a.

The yielding action is afforded by coil compression spring 168 which is held in compression between two collars 169 and 171. These collars are confined between shoulders on the inner stem 172 which is connected to the pivot 167 and between shoulders within the sleeve 164 which is connected to pin 166. An examination of Figure 9 will make it clear that the spring 168 will be stressed in compression by loads tending to lengthen and loads tending to shorten the pitman. All that the yielding pitman has to do is to shift the shaft 23 to establish the basic conditions for reversal because as soon as motion of the engine in either direction starts, the force reaction of the cam shaft holds the arm 31a against the appropriate lead controlling cam 33a or 34a, as the case may be.

Modification affording manual control

In Fig. 10 one alternative to the governor control of lead is indicated. This particular embodiment illustrates a manual control as typical of any means for operating the cams in the same sense to adjust lead.

Portions of the lead controlling cams are indicated at 33b and 34b. The coacting rack elements 37b and 38b are assembled on a rod 39b which is counterbored and internally threaded at its left hand end. The rod 39b has a flange 181 at its left end as shown, and nuts 182 threaded on its right hand end hold the parts in assembled relation. The racks are guided in ways exactly as indicated in Fig. 3, and this detail need not be elaborated.

A shaft 183 coaxial with rod 39b is swiveled in bracket 184 fixedly mounted on a portion of the engine frame, and a portion 185 of the rod 183 is threaded and engages the threads in the counterbored end of the rod 39b. The shaft 183 is turned by a crank 186 and each turn of the crank displaces the rod 39b by an amount equal to the lineal pitch of the threads 185.

A handle 187 is hinged to the crank 186 and carries a lug 188. By swinging the handle 187 downward from the position shown, the lug 188 enters a fork 189 on a portion of the bracket 184, and locks the shaft 183 against rotation. The handle 187 is shown in its active position with the lock disengaged. It is held in either its releasing or locking position selectively by an impositive detent comprising the spring urged plunger 191.

The construction shown in Fig. 10 shows a simple means for manually adjusting lead in a reversible engine, adjustments being made simultaneously and in the same degree for both directions of running.

The mechanism shown in Fig. 10 permits adjustment of the lead to the combustion characteristics of different fuel oils. While manual adjustment is suggested, the arrangement is adaptable to control in any known manner and by any known means, whether this be strictly independent and manual as shown, or related with some controlling element of the engine.

General considerations

The plunger 22 of Figure 1 is stated to operate the fuel injection pump, and because such pumps are standard articles of commerce, it is deemed unnecessary to illustrate any fuel pump in detail.

To avoid any possible misunderstanding it is stated that there would be one such pump for each cylinder in the engine and that control of engine speed requires the use of that known type of pump in which the quantity of fuel injected per cycle is subject to variation by the adjustment of a controlling member.

It is within contemplation that the pump controlling member which adjusts the amount of fuel per cycle may be directly connected to the member 157 so as to be positioned positively thereby. However, it is preferred that the pump controlling member be operated by a governor responsive to engine speed and wholly distinct from the governor 43 shown in Figure 3. The operation of the two governors would be coordinated to the extent they respond to the same engine speeds. However, the governor which controls the pump controlling member would include a loading mechanism of known form and that loading mechanism would be connected to the member 157 to modify the effect of the governor on the pump controller. All of this is known practice in the Diesel engine art, and to avoid undue complication the second or loaded governor is not illustrated. In the first place the use of such a governor is not essential, and in the second place its use involves aspects of no patentable moment.

Thus in the present application the member 157 is treated generically as an engine speed control because it may exercise that control by direct connection to the pump controller, or by indirect connection thereto through a variably loaded governor or in any other known way. The results are the same except that where the variably loaded governor is used the engine may be caused to run at substantially uniform speed regardless of load variations, which is advantageous in many fields, for example in marine propulsion.

It is not desirable in the preferred embodiment of Figs. 1–7 to control the fuel feed by the speed governor 43 because this would entail variable loading and such variable loading would undesirably affect lead control. Obviously in that embodiment the lead should vary directly with engine speed and this result would be defeated, or at least impaired, by the variable loading of the governor.

Thus where a fuel feed governor is used it is a governor distinct from and addiitonal to the illustrated governor 43.

Further, while it is preferred to reverse the operation of the air pilot valves by connection with the rock shaft 103, it could be reversed by any component which shifts as an incident to the reversing action. The arrangement illustrated is purely suggestive.

While several embodiments of the inventive concept have been described in considerable detail, these are intended to be illustrative and not limiting. The scope of the invention is defined solely in the claims, and modifications within the scope of such claims are possible and are contemplated.

What is claimed is:

1. In a reversible engine the combination of a crankshaft; a camshaft for timing events in the engine cycle; a drive train between said shafts including a shiftable element whose shift changes the angular relation between said shafts; reversing means for shifting said element through an engine reversing range; and controlling means wholly independent of said reversing means and serving to shift said element in limited timing ranges when such element is in each of the two running positions established by the reversing means.

2. In a reversible engine the combination of a crankshaft; a camshaft for timing events in the engine cycle; a drive train between said shafts including a shiftable element whose shift changes the angular relation between said shafts; reversing means for shifting said element through an engine reversing range; controlling means wholly independent of said reversing means and serving to shift said element in limited timing ranges when such element is in each of the two running positions established by the reversing means; and a governor responsive to crankshaft speed and connected to actuate said controlling means.

3. In a reversible engine, the combination of a crankshaft; a camshaft for timing events in the engine cycle; a drive train between said shafts including a shiftable element which resists the reaction of the force exerted by the crankshaft to drive the camshaft and which when shifted full range changes the angular relation of said shafts and thereby reverses the timing of such events, the parts being so arranged that such force reaction urges said element toward that end of its motion range which establishes the direction of running; reversing means for shifting said element through the engine reversing range; and timing means comprising adjustable stop means which sustain said element against said force reaction in each direction of running, the adjustment of said stop means serving to modify the timing of events controlled by the camshaft.

4. The combination defined in claim 3 in which the timing means comprise a pair of rotatable spiral cams, one effective for each direction of running, and a connection for rotating said cams in unison.

5. In a reversible engine, the combination of a crankshaft; a camshaft for timing events in the engine cycle; a drive train between said shafts including a shiftable element which resists the reaction of the force exerted by the crankshaft to drive the camshaft and which when shifted full range changes the angular relation of said shafts and thereby reverses the timing of such events, the parts being so arranged that such force reaction urges said element toward that end of its motion range which establishes the direction of running; reversing means for positively shifting said element through the major portion of the reversing range; yielding means effective at least in the terminal portions of the reversing range to complete the reversing shift; and timing means comprising adjustable stop means which sustain said element against said force reaction and determine its position within the range of said yielding means.

6. The combination defined in claim 5 in which the yielding means effective in the terminal portions of the reversing range comprise a cam and a spring urged plunger coacting therewith, one moving with the shiftable element and the other fixed against such motion.

7. The combination defined in claim 5 in which the reversing means for positively shifting said element through the major portion of the reversing range and the yielding means effective at least in the terminal portions of the reversing range comprise a toggle linkage which is yielding selectively in compression and in tension at least through a limited range.

8. In a reversible engine, the combination of a crankshaft; a camshaft for timing events in the engine cycle; a drive train between said shafts including a shiftable element which resists the reaction of the force exerted by the crankshaft to drive the camshaft and which when shifted full range changes the angular relation of said shafts and thereby reverses the timing of such events, the parts being so arranged that such force reaction urges said element toward that end of its motion range which establishes the direction of running; reversing means for positively shifting said element through the major portion of the reversing range; yielding means effective at least in the terminal portions of the reversing range to complete the reversing shift; a governor responsive to crank shaft speed; and timing stops connected to be adjusted by said governor, each within the range of action of said yielding means, and each stop serving to sustain said element against said force reaction in a corresponding direction of running and control the timing of events.

9. The combination defined in claim 8 in which the yielding means serving to complete the reversing shift comprises a cam moving with the shiftable element, and a spring-urged plunger which coacts with said cam near each limit of shift to urge the element yieldingly towards such limit.

10. The combination defined in claim 8 in which the reversing means for positively shifting the shiftable element, and the yielding means effective in the terminal portions of the reversing range take the form of a toggle linkage which is yielding selectively in compression and in tension through a limited range and unyielding beyond such range.

11. In a reversible engine, the combination of a crankshaft; a camshaft for timing events in the engine cycle; a drive train between said shafts including a shiftable element which resists the reaction of the force exerted by the crank shaft to drive the camshaft and which when shifted full range changes the angular relation of said shafts and thereby reverses the timing of such events, the parts being so arranged that such force reaction urges said element toward that end of its motion range which establishes the direction of running; a reversing member shiftable full stroke between forward and reverse running positions, the range of said motion being at least as great as the maximum range of motion of said shiftable element; adjustable stop means which sustain said shiftable element against said force reaction and thus determine its position for each direction of running; and a yielding actuating connection between said reversing member and said shiftable element.

12. In a reversible engine the combination of a crankshaft; a camshaft for timing events in the engine cycle; a drive train between said shafts including a shiftable element whose shift changes the angular relation between said shafts; reversing means for shifting said element through an engine reversing range; controlling means wholly independent of said reversing means and serving to shift said element in limited timing ranges when such element is in each of the two running positions established by the reversing means; a maneuvering shaft; means operable at one range of movement of the maneuvering shaft to actuate said reversing means through its reversing range; and means operable by said maneuvering shaft in another range to vary the energy input to the engine.

13. In a reversible engine, the combination of a crankshaft; a camshaft for timing events in the engine cycle; a drive train between said shafts including a shiftable element which resists the reaction of the force exerted by the crankshaft to drive the camshaft and which when shifted full range changes the angular relation of said shafts and thereby reverses the timing of such events, the parts being so arranged that such force reaction urges said element toward that end of its motion range which establishes the direction of running; reversing means for shifting said shiftable element at least through the major portion of the reversing range; and stop means for sustaining said shiftable element at the opposite limits of such range.

14. In a reversible engine, the combination of a crankshaft; a camshaft for timing events in the engine cycle; a drive train between said shafts including a shiftable element which resists the reaction of the force exerted by the crankshaft to drive the camshaft and which when shifted full range changes the angular relation of said shafts and thereby reverses the timing of such events, the parts being so arranged that such force reaction urges said element toward that end of its motion range which establishes the direction of running; reversing means for positively shifting said element at least through the major portion of the reversing range; yielding means effective at each limit of the reversing range to urge said element toward such limit; and stops which sustain said element against such force reaction at such limits.

15. In a reversible engine, the combination of a crankshaft; a camshaft for timing events in the engine cycle; a drive train between said shafts including a shiftable element which resists the reaction of the force exerted by the crankshaft to drive the camshaft and which when shifted full range changes the angular relation of said shafts and thereby reverses the timing of such events, the parts being so arranged that such force reaction urges said element toward that end of its motion range which establishes the direction of running; reversing means for shifting said shiftable element at least through the major portion of the reversing range, the connection between the reversing means and the shiftable element permitting lost motion therebetween; yielding means for taking up such lost motion; and stop means for sustaining said shiftable element at the opposite limits of such range.

16. In a reversible engine, the combination of a crankshaft; a camshaft for timing events in the engine cycle; a drive train between said shafts including a shiftable element which resists the reaction of the force exerted by the crankshaft to drive the camshaft and which when shifted full range changes the angular relation of said shafts and thereby reverses the timing of such events, the parts being so arranged that such force reaction urges said element toward that end of its motion range which establishes the direction of running, reversing means for shifting said shiftable element at least through the major portion of the reversing range, the connection between the reversing means and the shiftable element permitting lost motion therebetween; impositive detent means effective near each limit of shift to urge said shiftable element to the limit of the reversing range; and stop means for sustaining said shiftable element at the opposite limits of such range.

17. In a reversible engine, the combination of a crankshaft; a camshaft for timing events in the engine cycle; a drive train between said shafts including a shiftable element which resists the reaction of the force exerted by the crankshaft to drive the camshaft and which when shifted full range changes the angular relation of said shafts and thereby reverses the timing of such events, the parts being so arranged that such force reaction urges said element toward that end of its motion range which establishes the direction of running; a reversing member shiftable full stroke between forward and reverse running positions, the range of such motion being at least as great as the maximum range of motion of said shiftable element; adjustable stop means which sustain said shiftable element against said force reaction and thus determine its position for each direction of running; and means affording lost motion between said reversing member and said shiftable element and for yieldingly taking up said lost motion in the forward and reverse running positions.

18. The combination of an engine having a crankshaft and a camshaft for timing events in the engine cycle; a drive through which the cam shaft is driven from the crankshaft said drive including a shiftable element which when shifted changes the relation of said shafts to establish forward and reverse timing; stop means serving to define forward and reverse positions of said element; and reversing means serving to shift said element between said forward and reverse positions, the parts being so arranged that the stop means absorb the force reactions of the camshaft and relieve the reversing means therefrom.

19. In a reversible engine, the combination of a crankshaft; a camshaft for timing events in the engine cycle; a drive train between said shafts including a shiftable element which resists the reaction of the force exerted by the crankshaft to drive the camshaft and which when shifted full range changes the angular relation of said shafts and thereby reverses the timing of such events, the parts being so arranged that such force reaction urges said element toward that end of its motion range which establishes the direction of running; reversing means for shifting said element through the engine reversing range; and adjustable lead determining means for arresting the motion of said shiftable element at each end of such reversing range.

20. In a reversible engine the combination of a crankshaft; a cam shaft for timing events in the engine cycle; a drive train between said shafts including a shiftable element whose shift changes the angular relation between said shafts; reversing means for shifting said element through an engine reversing range; adjustable lead determining means for arresting the motion of said shiftable element at each end of such reversing range; a maneuvering shaft; means operable at one range of movement of the maneuvering shaft to actuate said reversing means through its reversing range; and means operable by said maneuvering shaft in another range to vary the energy input to the engine.

KURT FROEHLICH.
EMIL GRIESHABER.